US006780959B2

(12) United States Patent
Braat et al.

(10) Patent No.: US 6,780,959 B2
(45) Date of Patent: Aug. 24, 2004

(54) COMPOSITIONS COMPRISING FUNCTIONALIZED POLYPHENYLENE ETHER RESINS

(75) Inventors: Adrianus J. F. M. Braat, Roosendaal (NL); Herbert Shin-I Chao, Schenectady, NY (US); Hua Guo, Delmar, NY (US); Juraj Liska, Velky Krtis (SK); Gary William Yeager, Schenectady, NY (US)

(73) Assignee: General Electric Company, Pittsfield, MA (US)

(*) Notice: Subject to any disclaimer, the term of this patent is extended or adjusted under 35 U.S.C. 154(b) by 47 days.

(21) Appl. No.: 10/250,096

(22) Filed: Jun. 3, 2003

(65) Prior Publication Data

US 2003/0229196 A1 Dec. 11, 2003

Related U.S. Application Data

(60) Continuation of application No. 10/063,152, filed on Mar. 26, 2002, now Pat. No. 6,627,708, which is a division of application No. 09/683,352, filed on Dec. 18, 2001, now Pat. No. 6,469,124, which is a division of application No. 09/613,112, filed on Jul. 10, 2000, now Pat. No. 6,384,176.

(51) Int. Cl.[7] .................... C08G 65/00; C08G 65/38
(52) U.S. Cl. .................... 528/86; 528/162; 528/176; 528/192; 528/196; 525/391; 525/392; 525/397; 525/534
(58) Field of Search .................... 528/86, 162, 176, 528/192, 196; 525/391, 392, 397, 534

(56) References Cited

U.S. PATENT DOCUMENTS

| | | |
|---|---|---|
| 3,306,875 A | 2/1967 | Hay |
| 3,356,761 A | 12/1967 | Fox |
| 3,375,228 A | 3/1968 | Holoch et al. |
| 3,557,045 A | 1/1971 | Wright et al. |
| 3,597,216 A | 8/1971 | Berardinelli et al. |
| 3,637,578 A | 1/1972 | Wright et al. |
| 4,048,143 A | 9/1977 | Hay et al. |
| 4,148,843 A | 4/1979 | Goossens |
| 4,165,422 A | 8/1979 | White |
| 4,327,013 A | 4/1982 | Peters |
| 4,562,243 A | 12/1985 | Percec |
| 4,604,417 A | 8/1986 | Cottman |
| 4,634,742 A | 1/1987 | Percec |
| 4,663,402 A | 5/1987 | Percec et al. |
| 4,665,137 A | 5/1987 | Percec |
| 4,677,185 A | 6/1987 | Heitz et al. |
| 4,701,514 A | 10/1987 | Percec |
| 4,760,118 A | 7/1988 | White et al. |
| H521 H | 9/1988 | Fan |
| 4,806,601 A | 2/1989 | Percec |
| 4,816,515 A | 3/1989 | Weiss |
| 4,871,816 A | 10/1989 | Percec et al. |
| 4,874,826 A | 10/1989 | Sakamoto et al. |
| 4,888,397 A | 12/1989 | van der Meer et al. |
| 4,923,932 A | 5/1990 | Katayose et al. |
| 5,039,781 A | 8/1991 | Neugebauer et al. |
| 5,061,602 A | 10/1991 | Koch et al. |
| 5,071,922 A | 12/1991 | Nelissen et al. |
| 5,079,268 A | 1/1992 | Nelissen et al. |
| 5,091,480 A | 2/1992 | Percec |
| 5,171,761 A | 12/1992 | Penco et al. |
| 5,213,886 A | 5/1993 | Chao et al. |
| 5,218,030 A | 6/1993 | Katayose et al. |
| 5,219,951 A | 6/1993 | Nelissen et al. |

(List continued on next page.)

FOREIGN PATENT DOCUMENTS

| | | |
|---|---|---|
| DE | 31 17 514 | 5/1981 |
| DE | 3117514 | 12/1982 |
| DE | 41 03 140 A1 | 2/1991 |
| DE | 4103140 A1 | 8/1992 |
| EP | 0 135 124 A2 | 8/1984 |
| EP | 0 206 072 B2 | 6/1986 |
| EP | 261574 A2 | 9/1987 |
| EP | 385065 A1 | 1/1990 |
| EP | 498088 A1 | 12/1991 |
| NL | 8902092 | 8/1989 |
| WO | WO 01/40354 A1 | 6/2001 |
| WO | WO 01/53413 A1 | 7/2001 |
| WO | WO 03/076495 | 9/2003 |

OTHER PUBLICATIONS

U.S. patent application Ser. No. 10/119,406, Yeager et al., filed Apr. 9, 2002.
Chemical Abstract 98:73296.
Chemical Abstract 99:213561.
Chemical Abstract 109:171608.
Chemical Abstract 125:12414.
Derwent Abstract for JP08245872.
Coleen Pugh and V. Percec, "Group Transfer Polymerization of Some Unusual Acrylates and Methacrylates", Polym. Prepr. (Am. Chem. Soc., Div. Polym. Chem.), (1985), 26(2), 203–5.
Derwent Abstract for JP 08–245872.
US patent application,, filed on Jul. 2, 2002, 90 Pages Ser. No. not yet assigned.
European Search Report, Application No. 03254223.5–2102–, Ref 08CN–08786/9467, Date Sep. 16, 2003.

*Primary Examiner*—Duc Truong

(57) ABSTRACT

The invention relates to a polyphenylene ether resin containing residual aliphatic unsaturation as well as composites, blends, and articles made from the polyphenylene ether resin containing residual aliphatic unsaturation. Also included are reaction products between the polyphenylene ether resin containing residual aliphatic unsaturation and other resins and unsaturated resin formulations, e.g., thermosetting polyesters, acrylics, bismaleiimides, silicones, and allylics, and thermoplastics such as polyolefins, styrenics, rubbers, etc.

13 Claims, No Drawings

U.S. PATENT DOCUMENTS

| | | |
|---|---|---|
| 5,304,600 A | 4/1994 | Nelissen et al. |
| 5,310,820 A | 5/1994 | Nelissen et al. |
| 5,338,796 A | 8/1994 | Vianello et al. |
| 5,352,745 A | 10/1994 | Katayose et al. |
| 5,407,972 A | 4/1995 | Smith et al. |
| 5,612,425 A | 3/1997 | Weber et al. |
| 5,834,565 A | 11/1998 | Tracy et al. |
| 5,851,646 A | 12/1998 | Takahashi et al. |
| 5,965,663 A | 10/1999 | Hayase |
| 6,022,550 A | 2/2000 | Watanabe |
| 6,306,963 B1 | 10/2001 | Lane et al. |
| 6,352,782 B2 | 3/2002 | Yeager et al. |
| 6,384,176 B1 | 5/2002 | Braat et al. |
| 6,469,124 B2 | 10/2002 | Braat et al. |
| 6,521,703 B2 | 2/2003 | Zarnoch et al. |
| 6,593,391 B2 | 7/2003 | Teutsch et al. |
| 2001/0053820 A1 | 12/2001 | Yeager et al. |
| 2002/0028337 A1 | 3/2002 | Yeager et al. |
| 2002/0077447 A1 | 6/2002 | Hwang et al. |
| 2002/0169256 A1 | 11/2002 | Merfeld et al. |
| 2002/0173597 A1 | 11/2002 | Zarnoch et al. |
| 2002/0177027 A1 | 11/2002 | Yeager et al. |

COMPOSITIONS COMPRISING FUNCTIONALIZED POLYPHENYLENE ETHER RESINS

CROSS REFERENCE TO RELATED APPLICATIONS

This application is a continuation of U.S. application Ser. No. 10/063,152 filed 26 Mar. 2002, now U.S. Pat. No. 6,627,708 which is a division of U.S. application Ser. No. 09/683,352 filed 18 Dec. 2001, now U.S. Pat. No. 6,469,124 which is a division of U.S. application Ser. No. 09/613,112 filed 10 Jul. 2000, now U.S. Pat. No. 6,384,176.

BACKGROUND OF INVENTION

Polyphenylene ether resins (hereinafter "PPE") are commercially attractive materials because of their unique combination of physical, chemical, and electrical properties. Furthermore, the combination of PPE with other resins provides blends that result in additional overall properties such as chemical resistance, high strength, and high flow.

One technical obstacle to the development of such blends is the lack of compatibility between PPE and many resins. This lack of compatibility manifests itself often through very poor physical properties as well as delamination in molded parts. Methods have been developed to improve the PPE compatibility with many resins such as, for example, with polyesters and polyamides. One of the more effective methods involves functionalizing PPE to make functionalized PPE containing moieties such as acid, anhydride, epoxy, orthoester, and the like that are reactive with the other resin in the blend. It is believed that when the functionalized PPE is allowed to react with the other resin that relatively small amounts of copolymer between the resins are formed. The copolymer is believed to be in large part responsible for improved compatibility between the PPE and the other resin. Indications of improved compatibility include resistance to delamination, improved physical properties such as increased tensile and impact properties and a stabilized morphology between the blend component phases under static and/or low shear conditions.

Methods to prepare functionalized PPE have included solution functionalization with an acid halide containing compound, such as trimellitic anhydride acid chloride, to make an endcapped PPE containing at least one reactive moiety such as acid, anhydride, epoxy, orthoester, and the like. This method is rather limited in the variety of functionalized PPE that can be made. Also, the by-products from the capping reaction tend to cause emulsion and/or isolation issues in the solvent precipitation stage of the process.

Another known method to prepare functionalized PPE related to melt functionalization of the PPE in an extruder. This method involved melting and mixing PPE with a functionalizing agent to result in a functionalized PPE. The functionalizing agent is typically a compound containing a carbon-carbon double or triple bond and one of the aforementioned reactive moieties and is believed to react through the unsaturated bond to functionalize the PPE. Additional polymers could be fed into the same extruder or alternatively, the functionalized PPE could be isolated and subsequently used to prepare other compositions. Melt functionalization has issues, such as difficulty in feeding PPE into the extruder due to low bulk density and wide particle size distribution. Moreover, PPE are often powders and require special handling to avoid potential dust explosion.

As explained above, the methods known in the art teach functionalization of the PPE with reactive groups such as acid, anhydride, epoxy, orthoester, and the like. However, for blending PPE with resin systems that involve curing or polymerization reactions, including radical reactions, it would be highly desirable to have a PPE that contained residual aliphatic unsaturation and capped phenolic end groups at the same time. Incorporation of unsaturated species onto the PPE to result in an olefinic functionalized PPE may allow for chemical grafting to occur between the olefinic functionalized PPE and the other unsaturated species that are being polymerized. Moreover, the hydroxyl groups that exist on PPE may interfere with radical polymerization reactions of unsaturated monomers and lead to undesirable low polymerization rates of the unsaturated monomer species.

PPE known in the art typically are of fairly high molecular weight for blending in the melt phase with other polymers and generally have in excess of 50 repeat monomer units, most often in excess of 80 or more repeat monomer units. Consequently, functionalization reactions and isolation methods have been developed for high molecular weight PPE. Although many physical properties, such as tensile properties, are enhanced with the high molecular weight of the PPE in the polymeric blend, in other new resin blend compositions, such as, for example, the polymerization of vinyl-substituted aromatic monomers, the high viscosity of the PPE having more than 50 repeat monomer units is undesirable as it presents difficulty with mixing. Additionally, the overall number of available endgroups available for chemical modification becomes fairly limited as the molecular weight increases.

For blending PPE with resin systems that involve curing or polymerization reactions, including radical reactions, it would be highly desirable from the standpoints of low viscosity for mixing and a high endgroup number for functionalization to have a PPE that contained residual aliphatic unsaturation and that has less than 50 repeat monomer units on average, preferably less than about 35 repeat monomer units on average. It is therefore apparent that a need continues to exist for novel and improved methods to prepare functionalized PPE containing residual aliphatic unsaturation, especially low molecular weight PPE (i.e. PPE having an intrinsic viscosity less than about 0.30 dl/g as measured in chloroform at 30 Â° C.).

SUMMARY OF INVENTION

The needs discussed above have been generally satisfied by the discovery of a process for preparing functionalized PPE containing aliphatic unsaturation. In one embodiment, the process comprises oxidative coupling in a reaction solution at least one monovalent phenol species using an oxygen containing gas and a complex metal catalyst to produce a PPE; and functionalizing the PPE, preferably prior to and/or during at least one isolation step for devolatilization of the reaction solvent, with an unsaturated compound of the formula (I):

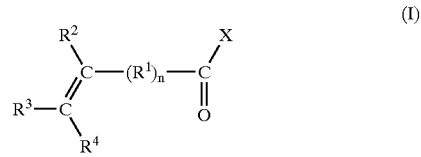

wherein $R^1$ is an aliphatic or aromatic residue, for example, —$CH_2$— but may be multiple —$CH_2$— groups, e.g., n can vary from 1 to about 10 or more, or alternatively, n may equal zero wherein the formula is an acrylic residue, and wherein each of $R^2$, $R^3$, and $R^4$ are independently hydrogen, alkyl, or aryl, and wherein X is a residue of one of the following formulae (II):

(II):

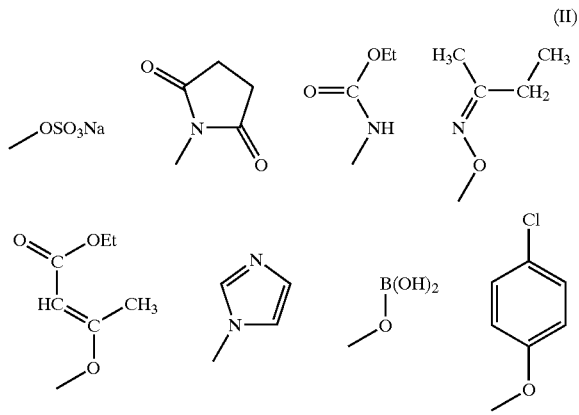

or wherein X is a halogen or a residue of the formula (III):

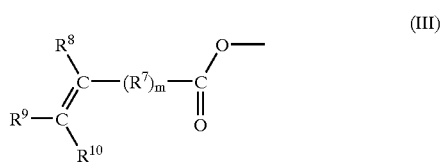

wherein $R^7$ is an aliphatic or aromatic residue, for example, —$C_2$— but may be multiple —$CH_2$— groups, e.g., m can vary from 1 to about 10 or more, or alternatively, m may equal zero (wherein if n and m both equal zero, the unsaturated compound is an acrylic anhydride), and wherein each $R^8$, $R^9$, and $R^{10}$ are independently hydrogen, alkyl, or aryl. In a preferred embodiment, the unsaturated compound is of the formula (IV):

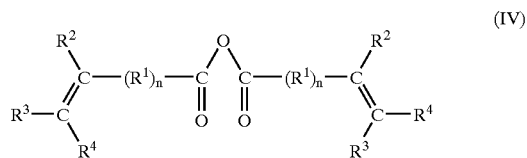

wherein each of n, $R^1$, $R^2$, $R^3$, and $R^4$ are as previously described. In an especially preferred embodiment, the unsaturated compound is of the formula

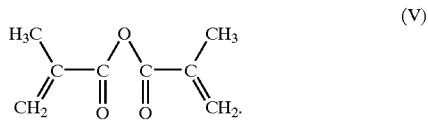

The description that follows provides further details regarding various embodiments of the invention.

DETAILED DESCRIPTION

One embodiment of this invention provides for a process for the preparation of functionalized PPE containing aliphatic unsaturation, preferably having an intrinsic viscosity between about 0.08 dl/g and 0.60 dl/g, more preferably between about 0.10 dl/g and about 0.30 dl/g, by oxidative coupling at least one monovalent phenol species, preferably at least a portion of which have substitution in at least the two ortho positions and hydrogen or halogen in the para position, using an oxygen containing gas and a complex metal-amine catalyst, preferably a copper (I)-amine catalyst, as the oxidizing agent and, preferably extracting at least a portion of the metal catalyst as a metal-organic acid salt with an aqueous containing solution, and functionalizing the PPE with the addition of at least one unsaturated anhydride of the formula (I) prior to and/or during at least one isolation step for removal of the reaction solvent. In one embodiment, the functionalization is at least partly done in a flash process to concentrate the PPE reaction solution. In another embodiment, the functionalization is at least partly done prior to a flash process to concentrate the PPE reaction solution. In yet another embodiment, the functionalization is at least partly done in a devolatilizing extruder. The functionalization reaction is preferably done in the presence of at least one catalyst, preferably an amine-type catalyst. These and other embodiments will become apparent in the description that follows.

The PPE employed in the present invention are known polymers comprising a plurality of structural units of the formula (VI):

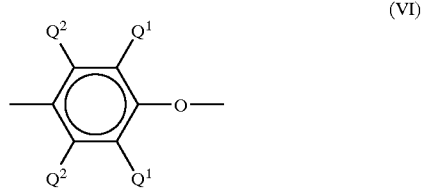

wherein each structural unit may be the same or different, and in each structural unit, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Most often, each $Q^1$ is alkyl or phenyl, especially $C_{1-4}$ alkyl, and each $Q^2$ is hydrogen.

Both homopolymer and copolymer PPE are included. The preferred homopolymers are those containing 2,6-dimethyl-1,4-phenylene ether units. Suitable copolymers include random copolymers containing such units in combination with (for example) 2,3,6-trimethyl-1,4-phenylene ether units. Also included are PPE containing moieties prepared by grafting vinyl monomers or polymers such as polystyrenes and elastomers, as well as coupled PPE in which coupling agents such as low molecular weight polycarbonates, quinones, heterocycles and formals undergo reaction in known manner with the hydroxy groups of two poly (phenylene ether) chains to produce a higher molecular weight polymer, provided a substantial proportion of free OH groups remains.

The molecular weight and intrinsic viscosity of the PPE can vary widely, depending at least in part on the intended end-use for the PPE. The intrinsic viscosity (hereinafter "I.V.") of the PPE is most often in the range of about 0.08–0.60 dl./g., preferably in the range of about 0.10–0.49 dl./g., more preferably in the range of about 0.10–0.30 dl./g., as measured in chloroform at 25Â° C. In one especially preferred embodiment, the PPE has an I.V. in the range of about 0.10–0.25 dl./g. One unexpected aspect of the process is the ability to utilize a very wide range of I.V.

The PPE are typically prepared by the oxidative coupling of at least one monohydroxyaromatic compound such as 2,6-xylenol, 2,3,6-trimethylphenol, or mixtures of the foregoing by methods known in the art. Catalyst systems are generally employed for such coupling and they typically contain at least one heavy metal compound such as a copper, manganese, or cobalt compound, usually in combination with various other materials.

It will be apparent to those skilled in the art from the foregoing that the PPE contemplated in the present invention include all those presently known, irrespective of variations in structural units or ancillary chemical features.

The functionalizing agents used in the present invention to introduce the aliphatic unsaturation onto the PPE are unsaturated compounds of the formula (I):

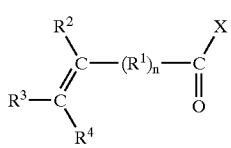
(I)

wherein $R^1$ is an aliphatic or aromatic residue, for example, —$CH_2$— but may be multiple —$CH_2$— groups, e.g., n can vary from 1 to about 10 or more, or alternatively, n may equal zero wherein the formula is an acrylic residue, and wherein each of $R^2$, $R^3$, and $R^4$ are independently hydrogen, alkyl, or aryl, and wherein X is a residue of one of the following formulae (II):

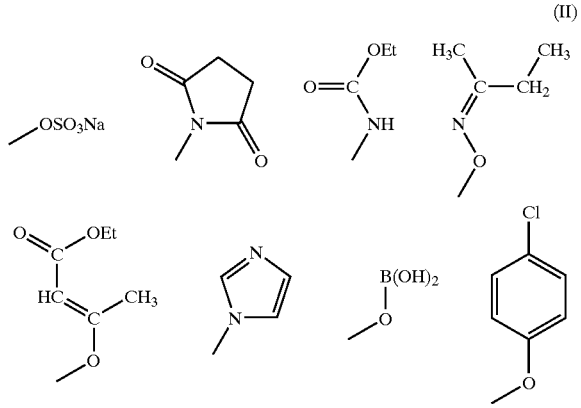
(II)

alternatively, X may be a halogen or may be a residue of the formula (III):

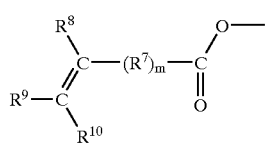
(III)

wherein $R^7$ is an aliphatic or aromatic residue, for example, —$CH_2$— but may be multiple —$CH_2$— groups, e.g., m can vary from 1 to about 10 or more, or alternatively, m may equal zero (wherein if n and m both equal zero, the unsaturated compound is an acrylic anhydride), and wherein each $R^8$, $R^9$, and $R^{10}$ are independently hydrogen, alkyl, or aryl.

In a preferred embodiment, the unsaturated compound is of the formula (IV):

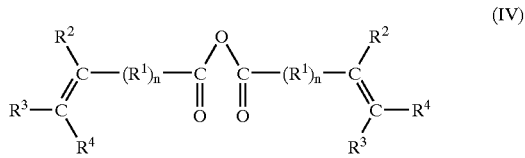
(IV)

wherein each of n, $R^1$, $R^2$, $R^3$, and $R^4$ are as previously described. In an especially preferred embodiment, the unsaturated compound is of the formula (V):

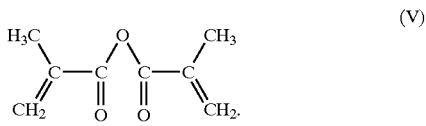
(V)

However, included within the scope of the present invention are "mixed" or "unsymmetrical" anhydrides of formula (IV).

Although not wishing to be bound by any theory on the nature or mechanism of the chemical reaction between the PPE and the unsaturated compound of formula (I), it is presumed that the functionalization of the PPE takes place through the hydroxyl groups on the PPE resulting in a PPE containing aliphatic unsaturation comprising the formula (VII):

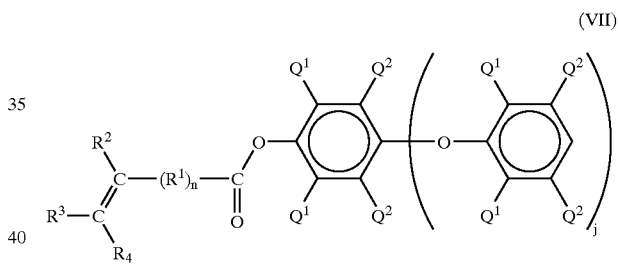
(VII)

$Q^2$, n, $R^1$, $R^2$, $R^3$, and $R^4$ is as previously defined and j comprises a range of values generally on average between about 10 and 110 depending in large part on the I.V. of the PPE. In one embodiment, j has an average value less than 49. In another embodiment, j has an average value less than 34. In a preferred embodiment, the PPE containing aliphatic unsaturation comprises the formula

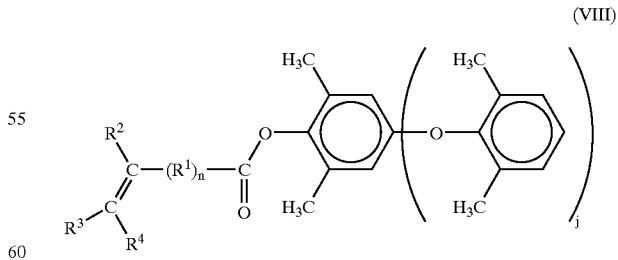
(VIII)

each of n,j,$R^1$, $R^2$, $R^3$, and $R^4$ is as previously defined. In an especially preferred embodiment, n is zero, $R^2$ is $CH_3$ or hydrogen and both of $R^3$ and $R^4$ are hydrogen. There can also be multiple aliphatic unsaturation introduced onto the PPE through incorporation of branching agents and/or coupling agents into the PPE backbone structure such that more than one end of the PPE contains hydroxyl groups for capping. Such branching agents and/or coupling agents are known in the art and include compounds such as, for example, tetramethylhydroquinone and trishydroxyphenol.

The functionalization reaction is preferably performed in a solvent, preferably in the polymerization reaction solvent. Suitable solvents are disclosed in the above-noted Hay patents. Aromatic solvents such as benzene, toluene, ethylbenzene, xylene, and o-dichlorobenzene are especially preferred, although tetrachloromethane, trichloromethane, dichloromethane, 1,2-dichloroethane and trichloroethylene may also be used.

One unexpected advantage of the present process when used to make functionalized low I.V. PPE is that a higher solids loading is possible as compared to processes that make higher (i.e. >0.28 I.V.) PPE. Without the increased solution viscosity build that concomitantly accompanies high molecular weight polymer, the final solids concentration can be increased by at least 20%, with increases of 30% or more possible. Thus, the present process affords a method for increased reactor utilization and productivity without increasing the size or number of the reactor vessels.

The temperature to carry out the functionalization stage of the invention generally ranges from about 20° C. to about 100° C., although higher temperatures are also possible. More preferably, the temperature range is from about 45° C. to about 80° C. At substantially higher temperatures, side reactions can occur leading to reaction by-products. One unexpected advantage of the present process is the relatively low temperatures that can be utilized and still achieve high levels of functionalization at acceptable reaction times.

After removal of the catalyst, the PPE containing solution is concentrated to a higher solids level as part of the isolation of the PPE. It was unexpectedly found that PPE can be readily functionalized to a PPE containing aliphatic unsaturation prior to and/or during this solvent removal process by addition of at least one functionalizing agent of the formula (I). The location of the addition of the at least one functionalizing agent will depend on several factors such as the stability of the agent, the volatility of the agent to the isolation conditions, the flexibility of the equipment for addition points, and the like. For functionalizing agents that are volatile in the isolation process, addition of the functionalizing agent prior to solvent removal is often preferred so as not to remove the functionalizing agent before it has functionalized the PPE. For less volatile functionalizing agents, greater flexibility in the location of the addition is possible. It is also possible to add functionalizing agent at several points during the process.

The amount of the above mentioned functionalizing agents that is required to appropriately functionalize the PPE is that which is sufficient to improve the compatibility between the various components in the final composition, i.e. between the PPE and the other resins and composite formulations, e.g., unsaturated polyesters, acrylics, and thermoplastics such as polyolefins. As previously discussed, indications of improved compatibility include resistance to delamination, improved physical properties such as increased tensile and impact properties and a stabilized morphology between the blend component phases under static or low shear conditions. For the most part, it is desirable for all hydroxy end groups on the PPE to be capped by the method of this invention. However, the invention includes compositions which contain a proportion of uncapped PPE; that is, PPE containing terminal hydroxy groups.

An effective amount of the above mentioned unsaturated compounds, based on the amount of the PPE, is generally up to about 3 molar equivalents, and is preferably up to about 2 molar equivalents, most preferably up to about 1.2 molar equivalents, all based upon the amount of terminal hydroxyl groups on the PPE as determined by FT-IR, usually in carbon disulfide. The actual amount utilized will also depend on, for example, the reactivity of the unsaturated functionalizing agent with the PPE hydroxyl groups, the catalyst employed, the reaction conditions, and the degree of capping that is desired in the PPE.

The capping efficiency and rate are improved by the addition of at least one catalyst. Although a wide variety of catalysts are useful, a particularly useful group of catalysts include the tertiary amines. It was unexpectedly found that 4-dialkylaminopyridines, such as 4-dimethylaminopyridine, as well as 4-pyrrolidinopyridine are especially useful for achieving high conversions at short reaction times under mild conditions as compared to other tertiary amines. The amount of catalyst can vary widely, however, the amount is generally an amount effective to improve the degree of conversion under a given set of reaction conditions as compared to the degree of conversion under the same conditions without the catalyst. Useful amounts generally range from about 0.1% by weight to about 10% by weight, preferably from about 0.5% by weight to about 5% by weight based on the amount of the PPE. An exact amount can be readily determined by statistical analysis under the reaction conditions, including the actual functionalizing agent reactivity, the reaction conditions, the equipment available, and the like without undue experimentation.

The functionalized PPE may be isolated in a variety of ways, including precipitation methods and total isolation methods. A total isolation process is often preferred for isolating the functionalized PPE when the I.V. is less than about 0.25 dl/g as measured in chloroform at 25° C. As part of the total isolation, a portion of the solvent is preferably removed in order to reduce the solvent load on the total isolation equipment. Concentration of the PPE containing solution is preferably accomplished by reducing the pressure in a solvent flash vessel while preferably increasing the temperature of the PPE containing solution. Pressures of about 35 to 50 bar are desirable with solution temperatures increased to at least 200° C., preferably of at least 230° C. A solids level of PPE of at least 55%, preferably of at least 65% or higher is desirable.

The unsaturated functionalizing agent can be effectively added to the PPE at several locations during the isolation process. For example, functionalizing agent may be added prior to removal of solvent, the functionalizing agent may be added during the concentration of the reaction mixture, or both. Likewise, functionalizing agent can be added with the concentrated reaction solution into the final devise for solvent removal. Functionalizing agent may alternatively be added simultaneously at several different locations. The selection of the addition location may be dictated by the actual equipment utilized and by the properties of functionalizing agent with a determination of an optimum location.

For total isolation processes, the final isolation of the functionalized PPE is preferably carried out in a devolatilizing extruder although other methods involving spray drying, wiped film evaporators, flake evaporators, and flash vessels with melt pumps, including various combinations involving these methods are also useful and in some instances preferred. As previously described, total isolation is preferable from the viewpoint that oligomeric species are not removed to the same degree as with precipitation.

Likewise, isolation yields are extremely high and are near quantitative. In these techniques it is highly preferred that the PPE polymerization catalyst (i.e. metal catalyst) removal be completed in the prior process steps as any metal catalyst remaining in solution will necessarily be isolated in the PPE.

Devolatilizing extruders and processes are known in the art and typically involve a twin-screw extruder equipped with multiple venting sections for solvent removal. The devolatilizing extruders most often contain screws with numerous types of elements adapted for such operations as simple feeding, devolatilization and liquid seal formation. These elements include forward-flighted screw elements designed for simple transport, and reverse-flighted screw and cylindrical elements to provide intensive mixing and/or create a seal. Particularly useful are counterrotating, non-intermeshing twin screw extruders, in which one screw is usually longer than the other to facilitate efficient flow through the die of the material being extruded. Such equipment is available from various manufacturers including Welding Engineers, Inc.

In the practice of one embodiment of the present invention, the preheated concentrated solution containing the functionalized PPE is fed into the devolatilizing extruder and maintained at a temperature less than about 300° C., and preferably less than about 275° C., with pressures in the vacuum vent of less than about 1 bar. The exact temperature will depend in large part on the I.V. of the functionalized PPE and the corresponding viscosity associated with that I.V. resin. It is noted that the functionalizing agent may alternatively be added at various locations along the length of the extruder with good results. The resultant solvent level is preferably reduced to less than about 1200 ppm, preferably less than about 600 ppm, and most preferably less than about 400 ppm.

Another unexpected result obtained through the use of a devolatilizing extruder was the extremely high yield of PPE achieved in the process. For example, a PPE yield of over 99% was obtained even for PPE having a low I.V. (typically on the order of about 0.08 dl/g to about 0.25 dl/g) whereas in the precipitation process known in the art, the yield of similar low I.V. PPE was less than 90%. Thus, the present process comprising a devolatilizing extruder affords a method to prepare functionalized low molecular weight polyphenylene ether resin containing aliphatic unsaturation, typically within the intrinsic viscosity range of about 0.08 dl/g to about 0.25 dl/g, in a yield of over 90%, preferably over 95%, more preferably over 98% and most preferably over 99%, based upon the amount of monovalent phenol utilized in the oxidative coupling.

When using a devolatilization extruder for the total isolation of the low I.V. functionalized PPE as previous described, it was found that traditional underwater or water spray cooling of strands of extrudate followed by chopping the extrudate into pellets gave unacceptable results presumably due to the low melt strength and inherent brittle nature of low I.V. PPE. It was found that special pelletization techniques can overcome these difficulties. Useful techniques include die-face pelletization, including underwater pelletization and flaking, declining angle strand pelletization using water spraying, and vibration drop pelletization with underwater pelletization especially suitable.

The collected PPE pellets can be dried using techniques standard in the art including centrifugal dryers, batch or continuous oven dryers, fluid beds, and the like. Determination of an appropriate set of conditions can be readily determined by one of skill in the art without undue experimentation.

As an alternative to completely isolating the functionalized PPE, one or more resins may be added to the devolatilized functionalized PPE in the same process. The one or more resins may be fed into the devolatilizing extruder although additional extruders may also be used. Possible variations include melt feeding the one or more resins into the devolatilizing extruder or melt feeding the functionalized PPE from the devolatilizing extruder into a second compounding extruder as well as combinations of these. Accordingly, in one embodiment a compatibilized blend is afforded by the process without complete isolation of the functionalized PPE. The one or more resins can vary widely and can also include additives common to such compatibilized blends. Such additives include impact modifiers, lubricants, flame retardants, pigments, colorants, fillers, reinforcing agents, carbon fibers and fibrils, and the like. Preferred resins include polyamides, polyesters, polyarylene sulfides, polycarbonates, polyetherimides, polyarylenes, functionalized polyolefins, polysulfones, polyethersulfones, and the like.

The functionalized PPE containing aliphatic unsaturation is especially useful in composite systems that involve a curing or polymerization step of unsaturated species, for example, styrene or acrylic-type monomers. It is believed that the aliphatic unsaturation introduced onto the PPE affords a reaction path to chemically link the PPE into composite system. Moreover, many of these same composite systems cure or polymerize, at least in part, through radical reactions. Uncapped PPE contains phenyl hydroxyl moieties that interfere with such radical reactions. In one embodiment, the functionalized PPE containing aliphatic unsaturation has the free hydroxyl groups "capped" reducing the interference. By "capped" is meant that at least about 80%, preferably at least about 90%, more preferably at least about 95% or more of the hydroxyl groups of the PPE have been reacted. It should be clear that the present invention also includes reaction products between the PPE containing aliphatic unsaturation and composite systems that involve a curing and/or polymerization step of unsaturated species. It should also be clear that the PPE containing aliphatic unsaturation is useful with a wide range of thermosetting resins, including but not limited to those selected from the group consisting of epoxy, phenolic, alkyds, polyester, polyimide, polyurethane, mineral filled silicone, bismaleimides, cyanate esters, vinyl, and benzocyclobutene resins and can react in a variety of pathways with such resins.

All patents cited by reference are incorporated herein by reference.

In order that those skilled in the art will be better able to practice the invention, the following examples are given by way of illustration and not by way of limitation.

EXAMPLES

Polymerization Reaction

A typical laboratory reaction recipe and reaction conditions are provided.

The catalyst solution can be prepared by stirring 0.41 g of cuprous bromide and 10.9 g of di-n-butyl amine in 100 ml of toluene. The catalyst is transferred to a one liter stirred glass reactor equipped with an internal cooling coil and inlet tubes for oxygen and monomer. A rapid stream of oxygen is introduced near the bottom of the reactor and a solution of 70 g of 2,6-xylenol in 100 ml of toluene is added through a metering pump, over a period of fifteen minutes, to the rapidly stirred solution. The temperature is maintained initially at about 40° C. to about 45° C./48° C. towards the end of the run by circulating water from a constant temperature bath through the cooling coil. Molecular weight build is continuously monitored with a typical reaction time to target I.V. of about 100–107 minutes.

In the glass reactor vessel, the copper catalyst was complexed by the addition of a complexant like nitrilotriacetic acid (NTA) or other copper complexing agent in order to solubilize it in the aqueous liquid phase. The equilibration time was approximately 70 minutes and the temperature was approximately 55Â° C. The catalyst was removed with centrifugation.

Although the conditions are for a laboratory scale reaction they in general scaleable to commercial processes carried out in commercial equipment without undue burden by one of skill in the art.

General Procedure for Preparing PPE Containing Residual Aliphatic Unsaturation

In a dry 250 ml 3-neck round bottom flask was added a 40 weight percent solution of PPE in toluene amount and a "magnet" for stirring. The flask was placed in a oil bath, the temperature was set to the reaction temperature. A slow nitrogen purge was applied and maintained during the reaction. The catalyst 4-dimethylaminopyridine (DMAP) or 4-dimethylbutylamine (DMBA) was added. After 15 minutes, when the catalyst had dissolved, the reaction was started by adding the amount of methacrylic anhydride (MAA). After about 30 minutes, the toluene was removed with vacuum stepwise decreasing from atmospheric pressure to about 40 mm Hg. The sample was dried in a vacuum oven for about 10 hours at about 120Â° C./10 mm Hg, ground to powder form and dried for another 3 hours at 120Â° C./10 mm Hg. The capping conversion was determined on the totally isolated methacrylic-PPE (by-product as MAA, methacrylic acid and DMAP were not removed). The [OH] content is measured by FT-IR (carbon disulfide). The capping conversion is calculated by the formula: Conversion %=(A−B)/A×100%, A=[OH]PPE ref., B=[OH] Methacrylic-PPE sample.

TABLE 1

| PPE type (dl/g) | OH for rx. (μmol/g) | OH after rx. (μmol/g) | Conv. (%) | MAA (wt % vs PPE) | Catalyst | Temp. (° C.) |
|---|---|---|---|---|---|---|
| 0.12 | 344 | 23 | 93 | 5.0 | DMAP | 80 |
| 0.12 | 344 | 74 | 78 | 10.0 | DMAP | 80 |
| 0.12 | 344 | 75 | 78 | 5.0 | DMAP | 260 |
| 0.12 | 361 | 208 | 42 | 5.0 | DMBA | 80 |
| 0.12 | 361 | 124 | 66 | 10.0 | DMBA | 80 |
| 0.12 | 361 | 122 | 66 | 15.0 | DMBA | 80 |
| 0.12 | 400 | 204 | 49 | 5.0 | DMBA | 260 |

As can be seen by these data, very high conversion to the capped PPE containing aliphatic unsaturation can be readily achieved. Moreover, it was unexpectedly found that DMAP gave appreciably higher conversions that DMBA.

Designed Experimental

A series of designed experiments were conducted to further exemplify embodiments of the invention using the same general procedure. The results are shown in Table 2.

TABLE 2

| Run | [MAA] in wt % | [DMAP] in wt % | Conversion (%) |
|---|---|---|---|
| 1 | 5.5 | 3 | 79 |
| 2 | 6 | 2 | 82 |
| 3 | 6 | 4 | 84 |
| 4 | 7 | 3 | 93 |

TABLE 2-continued

| Run | [MAA] in wt % | [DMAP] in wt % | Conversion (%) |
|---|---|---|---|
| 5 | 8 | 2 | 98 |
| 6 | 8 | 4 | 99 |
| 7 | 8.5 | 3 | 100 |

These reactions were conducted at 80° Celsius, for one hour, using 30 wt % PPE in toluene, with a stirring speed of 300 rpm.

As can be seen by the data in Table 2, high conversion can be readily obtained under a wide variety of conditions illustrating the broad utility of the present invention.

Total Isolation

Functionalized PPE containing residual aliphatic unsaturation was also prepared and totally isolated.

Step 1: MAA capping of PPO857 in Toluene. Conditions: 40 wt % PPE in Toluene, 6.5 wt % MAA and 3 wt % DMAP; 90Â° C., 300 rpm stirring, 2 hours, Nitrogen; recipe 180.1 g Toluene, 112.7 g PPE, 8.1 g MAA, 3.4 g DMAP. After the reaction, a ca. 20 g sample was poured out on aluminum disk. The toluene was allowed to evaporate at room temperature. The material was ground and dried for about 8 hours at about 120Â° C./10 mm Hg. The material transferred to a "Parr-bomb", see step 2.

Step 2: Methacrylic-PPE solution in toluene treatment at high temperatures and pressures. A 300 ml vessel for high temperature and high pressure, so-called Parr-bomb, was filled with solution of step 1. At 70Â° C., flush with nitrogen for about 5 minutes than the vessel was closed. After 10 minutes at about 245Â° C., the pressure readout was about 45 bar. The temperature was maintained at about 245Â° C. for about 30 minutes, then cooled to about 80Â° C. over about 30 minutes. The solution was poured out on aluminum disks. The toluene was allowed to evaporate at room temperature. The material was ground and dried for about 8 hours at about 120Â° C./10 mm Hg, and used for step 3.

Step 3: Extrusion of Methacrylic-PPE in Prism twin (16 mm screws) extruder. An 80 g sample of totally isolated methacrylic-PPE was used; all by-product were present. Conditions: barrel temperatures from nozzle to throat were 257-283-276-250Â° C.; 250 rpm, 25% Torque (5 Nm). The extrudate was dried for about 8 hours at about 120Â° C./10 mm Hg, afterwards ground.

TABLE 3

Results MAA/PPE reaction for direct isolation

| direct isolation | | % Conversion by FT-IR* | % double bonds by NMR** |
|---|---|---|---|
| Step 1 | Reaction in toluene | 92 | 83 |
| Step 2 | Treatment high temperature & pressure | 92 | Not determined |
| Step 3 | Extrusion | 90 | Not determined |

*Total isolation, by-products are present
**Extracted with ethanol to remove by-products The data in Table 3 demonstrate that the residual unsaturation can, unexpectedly, substantially survive the direct isolation thermal conditions. FT-IR analysis done before and after extrusion had critical peak ratios that were essentially constant, indicating very little change in the amount of double bonds or capping.

Capping of PPE Pellets From Direct Isolation

A series of capping reactions were conducted using PPE that had been isolated by total isolation using devolatilization of the PPE polymerization solvent.

In a typical experiment, to 1000 ml 4-neck round bottom jacketed glass reactor (L/D=1.5) equipped with a 45° pitch four-blade agitator operating at 1000 rpm was added toluene (311 g) at 40° C. followed by PPE pellet (0.12 I.V., 133 g) and the system was purged with nitrogen gas. The reaction solution temperature was increased to 60° C. and 4-N,N'-dimethylaminopyridine (DMAP, 6.7 g, 5% wt based on PPE) was added. The resulting solution was heated to 85° C., and then methacrylic anhydride (MAA, 16g, 12% wt based on PPE) was added. The solution was maintained at about 85° C. for about 30 to 400 minutes until the end capping reaction. At the end of reaction, the reaction solution was cooled, discharged from reactor, precipitated with 2 times volume of methanol, vacuum filtered with 100 mesh filtration cloth and vacuum dried for about 8 hours at 100° C. During reaction, every 30 minutes, about 1 ml reaction solution sample was taken and immediately dissolved into 25 ml carbon disulfide for testing of residual OH content. The [OH] content is measured by FT-IR (carbon disulfide). The capping conversion is calculated by the formula: Conversion %=(A−B)/A×100%, A=[OH]PPE ref., B=[OH] Methacrylic-PPE sample. The results of capping PPE pellets in solvent are listed in Table 4.

TABLE 4

Pre-Pilot capping reaction results

| Batch | MAA % | DMAP % | % CAPPED |
|---|---|---|---|
| Temp = 85° C. | | | |
| 1 | 8 | 2.75 | 82.6 |
| 2 | 8 | 0.5 | 81.0 |
| 3 | 12 | 5 | 99.4 |
| 4 | 8 | 5 | 89.7 |
| 5 | 12 | 0.5 | 98.5 |
| 6 | 8 | 2.75 | 82.6 |
| 7 | 10 | 2.75 | 98.9 |
| 8 | 12 | 5 | 100.0 |
| 9 | 12 | 2.75 | 99.4 |
| Temp = 45° C. | | | |
| 10 | 12 | 2.75 | 99.4 |

The above examples demonstrate the high levels of capping that can be achieved using PPE that has been directly isolated by removal of the PPE polymerization solvent. It was unexpected that such a high degree of capping would be achieved without having to pre-wash the PPE solution to remove impurities from the polymerization reaction.

Large Scale Capping PPE Pellet in Solution

To illustrate the commercial feasibility of one embodiment of the invention, to a 300 gal 316 stainless steel reactor (L/D=1.1) equipped with two layer three blade propeller variable speed agitator (43 to 430 rpm) and a jacket and external circulation loop through a heat exchanger to control reaction temperature was added 250 lb. of low I.V. PPE (0.12 I.V.) pellets obtained from a total isolation of the PPE reaction solution using devolatilization equipment with 564 lbs of toluene at room temperature. To the reaction solution was added 6.9 lbs. (2.75% wt based on PPE) of 4-N,N'-dimethylaminopyridine (DMAP) and 25 lbs (10% wt based on PPE) of methacrylic anhydride (MAA). The reaction temperature was controlled to about 85° C. Essentially 100% OH conversion was achieved after about 150 minutes as detected by FT-IR analysis.

PPE Pellet Capping in Styrene

To a three-necked round bottom flask equipped with an overhead mechanical stirrer, a condenser, and a thermocouple was added styrene (200 mL), followed by PPE (0.12 I.V., 181.8 g) and 4-N,N'-dimethylaminopyridine (DMAP, 1.22 g). The resultant solution was heated to about 85° C., and methacrylic anhydride (MAA, 21.8 g) was added. The solution was maintained at about 85° C. for about 8 hours to complete the reaction. The capping efficiency was found to be 98.5%. Table 5 is a summary of results.

TABLE 5

Lab Results of Capping Low IV PPE in Styrene Monomer

| | PPE (g) | Styrene (mL) | DMAP (g) | MAA (g) | Reaction temp (° C.) | Reaction time (hrs) | Capping efficiency (%) |
|---|---|---|---|---|---|---|---|
| 1 | 181.8 | 200 | 5 | 21.8 | 85 | 2 | 100.0 |
| 2 | 181.8 | 200 | 2.5 | 21.8 | 85 | 4 | 99.7 |
| 3 | 181.8 | 200 | 1.22 | 21.8 | 85 | 8 | 98.5 |
| 4 | 181.8 | 200 | 0.61 | 21.8 | 85 | 17 | 98.2 |

These results illustrate that very high PPE capping conversions can be achieved in the presence of a polymerizable monomer such as a vinyl aromatic material such as styrene monomer.

One unexpected advantage of capping PPE that has not been isolated is a reduction in color when used in many applications. For example, a 10 weight percent styrene solution of MAA capped 0.12 IV PPE made from direct capping reaction body feed had a Î𝐸 of 56 as compared to a 10 weight percent styrene solution of MAA capped 0.12 IV PPE made from capping re-dissolved 0.12 IV PPE pellet in toluene had a Î𝐸 of 66. This reduction in color is unexpected in view of the prior art in which one would expect the color to be very similar.

These and other embodiments should be apparent from the disclosure contained herein.

We claim:

1. A composition, comprising:
a polyphenylene ether resin of the formula

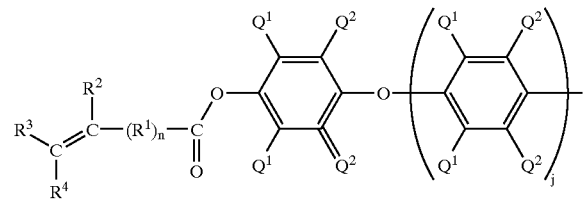

wherein $R^1$ is an aliphatic or aromatic residue; n is 0 to about 10; $R^2$ is hydrogen or methyl; $R^3$ and $R^4$ are hydrogen; j has an average value less than 49; each $Q^1$ is methyl; and each $Q^2$ is independently hydrogen or methyl.

2. The composition of claim 1, wherein $R^2$ is hydrogen.

3. The composition of claim 1, wherein $R^2$ is methyl.

4. The composition of claim 1, wherein each $Q^2$ is hydrogen.

5. The composition of claim 1, wherein j has an average value less than 34.

6. The composition of claim 1, wherein the polyphenylene ether resin comprises 2,6-dimethyl-1,4-phenylene ether units and 2,3,6-trimethyl-1,4-phenylene ether units.

7. The composition of claim 1, wherein the polyphenylene ether resin has an intrinsic viscosity of about 0.08 to about 0.25 dl/g as measured in chloroform at 25° C.

8. The composition of claim 1, wherein the polyphenylene ether resin has an intrinsic viscosity of about 0.08 to about 0.16 dl/g as measured in chloroform at 25° C.

9. The composition of claim 1, further comprising styrene.

10. A composition, comprising:

a polyphenylene ether resin of the formula

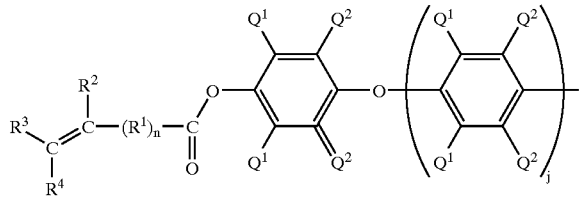

wherein $R^1$ is an aliphatic or aromatic residue; n is 0; $R^2$ is hydrogen or methyl; $R^3$ and $R^4$ are hydrogen; j has an average value less than 49; each $Q^1$ is methyl; and each $Q^2$ is is hydrogen.

11. The composition of claim 10, further comprising styrene.

12. A composition, comprising:

a polyphenylene ether resin of the formula

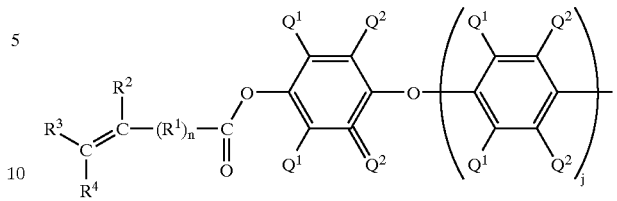

wherein $R^1$ is an aliphatic or aromatic residue; n is 0; $R^2$ is methyl; $R^3$ and $R^4$ are hydrogen; j has an average value less than 49; each $Q^1$ is methyl; each $Q^2$ is hydrogen; and wherein the polyphenylene ether resin has an intrinsic viscosity of about 0.08 to about 0.16 dl/g as measured in chloroform at 25° C.

13. The composition of claim 12, further comprising styrene.

* * * * *